United States Patent
Nehse et al.

(10) Patent No.: US 7,254,262 B2
(45) Date of Patent: Aug. 7, 2007

(54) METHOD OF OPTIMIZING TARGET QUANTITIES FOR OPTICAL PRECISION MEASUREMENT AND APPARATUS THEREFOR

(75) Inventors: Uwe Nehse, Geraberg (DE); Gerhard Linss, Suhl (DE); Olaf Kühn, Suhl (DE)

(73) Assignee: Carl-Zeiss-Stiftung, Heidenheim (Brenz) (DE)

( * ) Notice: Subject to any disclaimer, the term of this patent is extended or adjusted under 35 U.S.C. 154(b) by 797 days.

(21) Appl. No.: 10/687,914

(22) Filed: Oct. 20, 2003

(65) Prior Publication Data

US 2004/0131244 A1   Jul. 8, 2004

Related U.S. Application Data

(63) Continuation of application No. PCT/EP02/03921, filed on Apr. 9, 2002.

(30) Foreign Application Priority Data

Apr. 18, 2001   (DE) .................. 101 19 026
Aug. 18, 2001   (DE) .................. 101 40 640

(51) Int. Cl.
   *G06K 9/00*   (2006.01)

(52) U.S. Cl. ..................................... 382/141

(58) Field of Classification Search ........ 382/141–151, 382/291; 348/86–87, 92, 94–95, 125
See application file for complete search history.

(56) References Cited

U.S. PATENT DOCUMENTS

| 4,202,014 A |   | 5/1980  | Gilligan et al. |
| 4,691,365 A |   | 9/1987  | Nagashima |
| 5,193,124 A |   | 3/1993  | Subbarao |
| 5,376,991 A |   | 12/1994 | Kaneda et al. |
| 5,801,374 A | * | 9/1998  | Campbell et al. ........ 250/208.2 |
| 5,978,027 A |   | 11/1999 | Takeda |

FOREIGN PATENT DOCUMENTS

| EP | 0566307 | 10/1993 |
| EP | 0606018 | 7/1994 |

OTHER PUBLICATIONS

James Wayant "Precision Optical Testing", Science, vol. 206, pp. 168-172, 1979.*

* cited by examiner

*Primary Examiner*—Daniel Mariam
(74) *Attorney, Agent, or Firm*—Walter Ottesen

(57) ABSTRACT

A method for optimizing target quantities for optical precision measuring includes obtaining ancillary parameters from image data of a workpiece which is to be measured. Control data for influence quantities of the target quantities are derived from the ancillary parameters. The control data is derived as follows: by determining the courses of the ancillary parameters depending on at least one influence quantity and the courses of the ancillary parameters are determined in such a way that the courses have a like extremum of the functional dependence from the influence quantities. An overall course of the ancillary parameters is determined and an extremum of the overall course of the ancillary parameters is determined. Corresponding values of the influence quantities are determined at the site of the determined extremum as control data for the influence quantity.

38 Claims, 4 Drawing Sheets

METHOD OF OPTIMIZING TARGET QUANTITIES FOR OPTICAL PRECISION MEASUREMENT AND APPARATUS THEREFOR

RELATED APPLICATION

This application is a continuation application of international patent application PCT/EP 02/03921, filed Apr. 9, 2002 and claiming priority from German applications 101 19 026.3, filed Apr. 18, 2001, and 101 40 640.1, filed Aug. 18, 2001.

FIELD OF THE INVENTION

The invention relates to a method for optimizing target quantities for the optical precision measurement technology by obtaining ancillary parameters from the image data and deriving control data for influence quantities.

BACKGROUND OF THE INVENTION

Methods of this kind are today already used in precision measuring technology in optical measurement methods described hereinafter. For example, video cameras having a one-dimensional CCD chip or a two-dimensional CCD chip are used in precision measuring technology and, with these cameras, a workpiece, which is to be measured, or portions thereof can be recorded. When the video camera is movably journalled relative to the workpiece to be measured in one or several dimensions (for example, when the video camera is utilized as a sensor in a coordinate measuring apparatus), also several different sections of the workpiece can be recorded and then brought into geometric relationship with each other. Gray value differences of the recorded image arise at the structures of a workpiece to be measured, such as especially at the edges. From these gray value differences, the 2D structure site can be determined. With the aid of this determination, the workpiece or individual features thereof, such as bores, can be measured in two dimensions.

The determination of the structure site from the gray values is, however, especially then not easily possible when the workpiece to be measured is illuminated with direct light. For a clear determination of a 2D structure site (such as especially an edge), the workpiece surface should exhibit a uniform brightness. Actually, however, the illumination with incident light emphasizes the structures on the surface of the workpiece to be measured so that no symmetrical intensity courses arise. For this reason, ancillary parameters must be obtained in the image evaluation. These ancillary parameters are characterized as so-called edge site criteria based upon which a structure site, especially an edge, can be determined as given. One such edge site criterion is, for example, a so-called differential edge site criterion which determines a structure site as given when the gray value differences of mutually adjacent image points exhibit a maximum change. Another edge site criterion is the so-called threshold value criterion which determines a structure site, especially an edge, as given when the gray values of an image element are within a pregiven range.

If not only two-dimensional features are to be determined, such as the outer dimensions of a printed circuit board, but instead a complete geometric determination in all three dimensions is to be undertaken then, in addition to the lateral two-dimensional image data, the spatial arrangement as to the distance data between the video camera and the workpiece surface is necessary. This distance data of the workpiece surface to the video camera can be obtained with the aid of focus methods. For this purpose, the focus of the video camera, however, has to be automatically adjusted to the workpiece surface. For this, different so-called focus criteria are known. A criterion of this kind is, for example, the contrast of the image recorded by the video camera. When this contrast is a maximum, it is assumed that the surface of the workpiece to be measured is disposed in the focus. Other criteria are, for example, the gray value differences between different image elements or the mean value of all gray image values or the standard deviation of gray image values.

It is therefore the objective in the above-mentioned measurement methods to determine as exactly as possible the position of the edge and/or the distance of the workpiece surface to the video camera in order to be able to measure the workpiece as accurately as possible. For this reason, the target quantities "2D structure site" and/or "focus site", should be optimized. These target quantities, however, vary with different influence quantities. Influence quantities which act on the target quantity "2D structure site" are, for example, the brightness, the wavelength or the location of the illumination which illuminates the workpiece to be measured. It is especially difficult when several different illuminations are present. Another influence quantity, which acts on the target quantity "2D structure site" is the edge site criterion. An influence quantity which acts on the focus site is, for example, the selection of a suitable focus criterion.

In the past, the control data for the influence quantities were derived by the programmer of the measuring sequence subjectively from the video images of the video camera. These influence quantities are, for example: the control data for the different brightnesses of several illuminations; the selection of a suitable edge site criterion; or, the selection of a suitable focus criterion. On the basis of a video image of the camera, which was displayed on a monitor, the programmer of the measuring sequence has so shifted the illuminators and/or selected a focus criterion and/or an edge site criterion that, according to the subjective estimate of the programmer, an optimal measuring of the particular edge site appeared possible.

Stated otherwise, with such optical inspection systems and coordinate measuring apparatus, the task of the operator is to so adapt the illumination conditions while considering the optical characteristics of the measurement object that a focusing and obtaining of contact points (geometric contacting) is possible with highest accuracy and reproducibility. For this purpose, a selection of the focus criterion as well as the scanning method (edge site criterion) is required by the operator for determining the structure site corresponding to the characteristics of the measurement object and the illumination conditions. The quality of the determined results is therefore dependent upon the experience of the measuring technician.

It is disadvantageous with this conventional procedure that the adjustment of the influence quantities is coupled exclusively to the abilities of the programmer and especially an optimal selection of the influence quantities was practically not possible.

European patent publication 0,566,307 discloses an automatic focus control wherein only a single focus criterion is used, namely, the mean brightness of the image which is maximum in the focus. In order to determine in which direction a lens, which adjusts the focus, should be moved, the mean brightness is determined in several different frequency bands. The brightness measurement values of the different frequency bands of two mutually adjacent positions of the lens are then mathematically further processed so that the direction can be determined in which the lens has to be moved in order to get into the focus.

European patent publication 0,606,018 discloses an arrangement for automatically adjusting the focus of a video camera. Here, likewise only a focus criterion "contrast" is derived from the image data. The course of this focus criterion is determined in the horizontal image direction and in the vertical image direction. The two courses of the focus criterion are separately evaluated as to at which lens position these courses become maximum. The results are given to a so-called lens controller which shifts the position of the objective lenses. If one of these courses leads to no usable result, the focus is adjusted by the lens controller only on the basis of the other course. If, in contrast, both courses lead to a result, then the focus is adjusted on the basis of one of the two courses.

U.S. Pat. No. 4,691,365 discloses a light control for an image reading apparatus or scanner. This light control is based on the evaluation of the digital image for which a shading correction is simultaneously undertaken. The control described herein is not usable because of the completely different requirements which are necessary in the measurement of a structure site in the optical precision measuring technology.

U.S. Pat. No. 4,202,014 discloses an automatic exposure control for a television camera wherein the light quantity, which incidents in the television camera, is controlled by a pulse-shaped opening and closing of the shutter. The exposure control described here can also not be used because of the completely different requirements which are necessary for the measurement of a structure site in the optical precision measurement technology.

A dissertation entitled "Beleuchtungs—und Fokusregelungen für die objektivierte optische Präzisionsantastung in der Koordinatenmessung" of Uwe Nehse, was published in the edition "Wissenschaft, Unterbereich Maschinenbau, Tectum Verlag Marburg (2001) ISBN 3-8288-1207-4, wherein essential components of the invention are published.

SUMMARY OF THE INVENTION

It is an object of the invention to provide a method with which control data can be generated for the influence quantities in an especially advantageous automated manner.

The method of the invention is for optimizing target quantities for optical precision measuring. The method includes the steps of: obtaining ancillary parameters from image data and deriving control data for influence quantities; determining a weighted summation of the individual ones of the ancillary parameters for the target function to be optimized; and, determining all ancillary parameters in such a manner that they have a like extremum of the functional dependency of the influence quantities.

What is special in the method of the invention is how the control data is derived for the influence quantities.

For determining the control data, the courses of the ancillary parameters are first determined in dependence upon one or several influence quantities. The courses of the ancillary parameters are so determined that the courses have a like extremum of the functional dependency from the influence quantities, that is, either all courses exhibit a maximum in the optimum or all courses exhibit a minimum in the optimum. Insofar as this is not directly possible for individual ancillary parameters, a like extremum of the functional dependency from the influence quantity can take place via a difference formation of a determined value with an input value.

It is expressly noted that the concern here is the courses of at least two different ancillary parameters which are determined in accordance with different methods, that is, for example, contrast, homogeneity, mean brightness and/or gradient. In contrast, what is not intended is different courses of the same ancillary parameters which, for example, are determined for different image regions or different frequency bands such as shown in European patent publication 0,606,018 or European patent publication 0,566,307.

In the next step, the total course of the ancillary parameter is determined in dependence upon the influence quantity or the influence quantities via weighted summation of the individual courses of the ancillary parameter. Thereafter, an extremum, that is, a maximum or a minimum of the total course of the ancillary parameter is determined.

In a last step, the associated value of the influence quantity at the site of the determined extremum is determined as information data for the influence quantity. This control information defines how the influence quantity should be adjusted.

The weighting factors for the weighted summation of the traces of the ancillary parameters can be selected differently and are principally determined experimentally. However, these weight factors are preferably so selected that a standardization of all ancillary parameters takes place. In this way, it can be substantially ensured that the course of each ancillary parameter contributes to the result.

In order to reduce the number of image points to be evaluated and therefore the evaluation time, one or more evaluation lines can be generated in the image data which extend at both ends of the structure to be measured. The particular courses of the ancillary parameters, which are necessary for the particular control data, can be determined from the evaluation lines. Even though this is not perforce required, the evaluation lines are nonetheless advantageously essentially perpendicular to the structure.

The image datum based on which the ancillary parameters are determined is usually made available directly by the image recording device for measuring the workpiece, that is, as a rule, by the video camera. Alternatively, the determination of the ancillary parameters, especially for influence quantities of the illumination, can result also advantageously from simulated image data which are generated with illumination models of the computer graphics.

At least one of the influence quantities advantageously is the illumination since, up to now (and different from the control of the focus site), no usable ancillary parameters have been available with which an optimal adjustment of the illumination would have been possible in the optical precision measurement technology. The determination of a parameter set of the reflection and transmission characteristics, which is characterized as bi-directional reflectance function, makes possible especially advantageously the determination of the course of suitable ancillary parameters.

As an important influence quantity of the illumination, for which control parameters can be derived, the brightness of the illuminators is noted. As additional influence quantities, the wavelength can be mentioned with which the illuminations illuminate the workpiece and the site from which the illuminations illuminate the workpiece.

The course of ancillary parameters is determined from image points which are arranged on both sides of the structure to be measured, preferably on an evaluation line. With these ancillary parameters, courses of the ancillary parameters for the influence quantities of the illumination can be achieved which can be easily evaluated. Advantageously, the number of the evaluated image points on the one side of the structure is approximately the same as the number of image points evaluated on the other side of the structure.

For the determination of the course of the ancillary parameters, from which a control parameter for the influence quantity for the illumination can be derived, a plurality of images has to be recorded. In each image, a different illumination adjustment must be made, that is, another adjustment of the brightness, the wavelength and/or the site of one of the illuminations. In order to be able to achieve as rapidly as possible this image data for the determination of the course of the ancillary parameters, an image sequence with a synchronized controllable illumination source can be recorded by a camera. Illumination adjustment is changed between the images.

In another especially advantageous embodiment, at least one of the influence quantities relates to the potential structure site. At this point, the difference between the terms "structure" and "edge" is explained. An edge is only a special case of a structure. This will be explained by way of example. For example, with the optical precision measuring technology, the transition of two mutually abutting materials (for example, copper and graphite) can be measured if these materials exhibit different optical characteristics. Even though no edge is present, a structure site can nonetheless be determined.

In another advantageous embodiment, at least one influence quantity relates to the lens position of the objective of the image recordation device with which the focusing of the objective can be adjusted.

BRIEF DESCRIPTION OF THE DRAWINGS

The invention will now be described with reference to the drawings wherein:

FIG. 4 is a schematic of a normalized gray value course in the region of the edge Ka of FIG. 3a;

DESCRIPTION OF THE PREFERRED
EMBODIMENTS OF THE INVENTION

Figure 1:
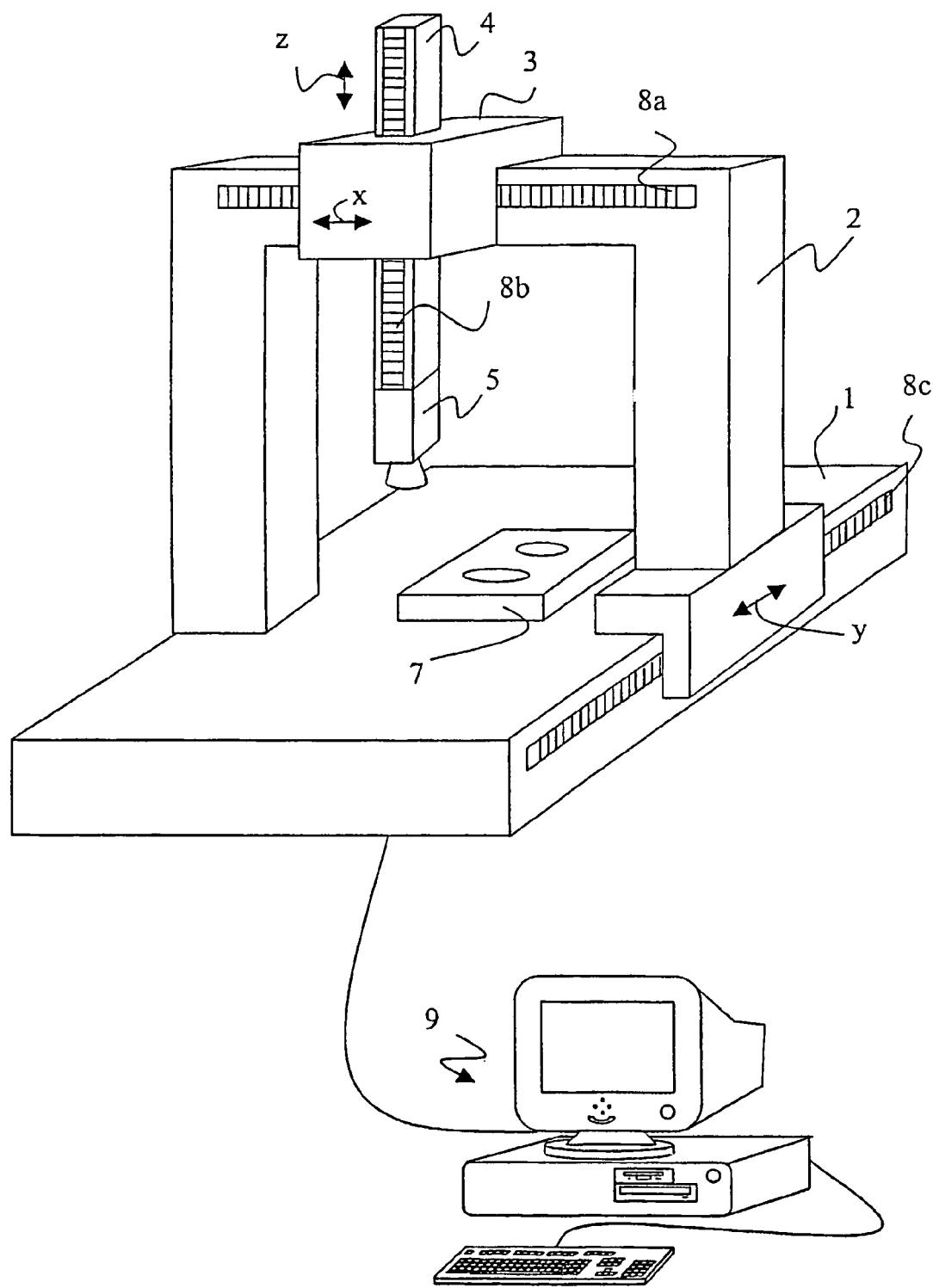
FIG. 1 is a perspective view of a coordinate measuring apparatus on which the method of the invention can be carried out.

FIG. 1 shows by way of example a precision measuring apparatus in the form of a coordinate measuring apparatus with which the method of the invention can be carried out. The coordinate measuring apparatus includes a measuring table 1 having a surface on which the workpiece 7 to be measured can be supported. A portal 2 is movably guided along the measuring table surface in the direction identified by arrow y. The particular position of the portal in the direction shown by the arrow y can be determined by a read-out head (not shown) which scans a measuring scale 8c. In addition, a drive is provided.

A slide 3 is movably guided in the direction identified by arrow x along the part of the portal 2 spanning the measuring table 1. The position of the slide 3 can likewise be determined by scanning a scale 8a and the slide likewise can be moved by a drive. A spindle 4 is movably guided on the slide 3 in the direction of arrow z. The position of the spindle can be determined by scanning the scale 8b attached to the spindle 4. The spindle can likewise be motorically driven. A video camera 5 is attached as a measuring sensor at the lower end of the spindle 4. With the video camera, the upper surface of the workpiece 7, which is to be measured, can be optically scanned. In addition to the usual devices for recording an image, such as the objective and a CCD chip, the video camera 5 additionally has illuminators or light sources integrated into the housing of the video camera 5 via which the workpiece 7 can be illuminated.

To move the video camera 5 in the three coordinate directions (x, y, z), a computer 9 is provided which drives the drives for the portal 2, the slide 3 and the spindle 4 for this purpose. Furthermore, the measuring computer evaluates the position values scanned from the scales (8a, 8b, 8c) and functions as an image evaluation device for evaluating the image data supplied by the video camera 5 in order to evaluate measurement results therefrom.

In an advantageous embodiment of the coordinate measuring apparatus, the video camera 5 can be attached to the mechanical assembly via a so-called rotation-pivot unit. Such a rotation-pivot unit includes two rotation joints perpendicular to each other. The spatial position of the video camera 5 can be additionally changed by rotation about these rotation joints so that, referred to the coordinate measuring apparatus of FIG. 1, also the vertical side surfaces of the workpiece 7 can be scanned with the video camera 5.

It is understood that the coordinate measuring apparatus shown here is configured purely by way of example. For example, in lieu of the portal mechanical assembly shown here, another mechanical assembly could be used in order to be able to move the video camera relative to the workpiece in the three coordinate directions. For example, a so-called stand mechanical assembly can be provided. What is essential for the coordinate measuring apparatus is only that the measuring sensor system, here the video camera 5, can be moved relative to the workpiece 7 in the three coordinates (x, y, z).

In lieu of a coordinate measuring apparatus, also a much simpler precision measuring apparatus can be used for simpler measuring tasks such as the measurement of printed circuit boards. Here, the video camera 5 can be moved only in two coordinate directions or only in one coordinate direction or even not at all relative to the workpiece.

Figure 2:
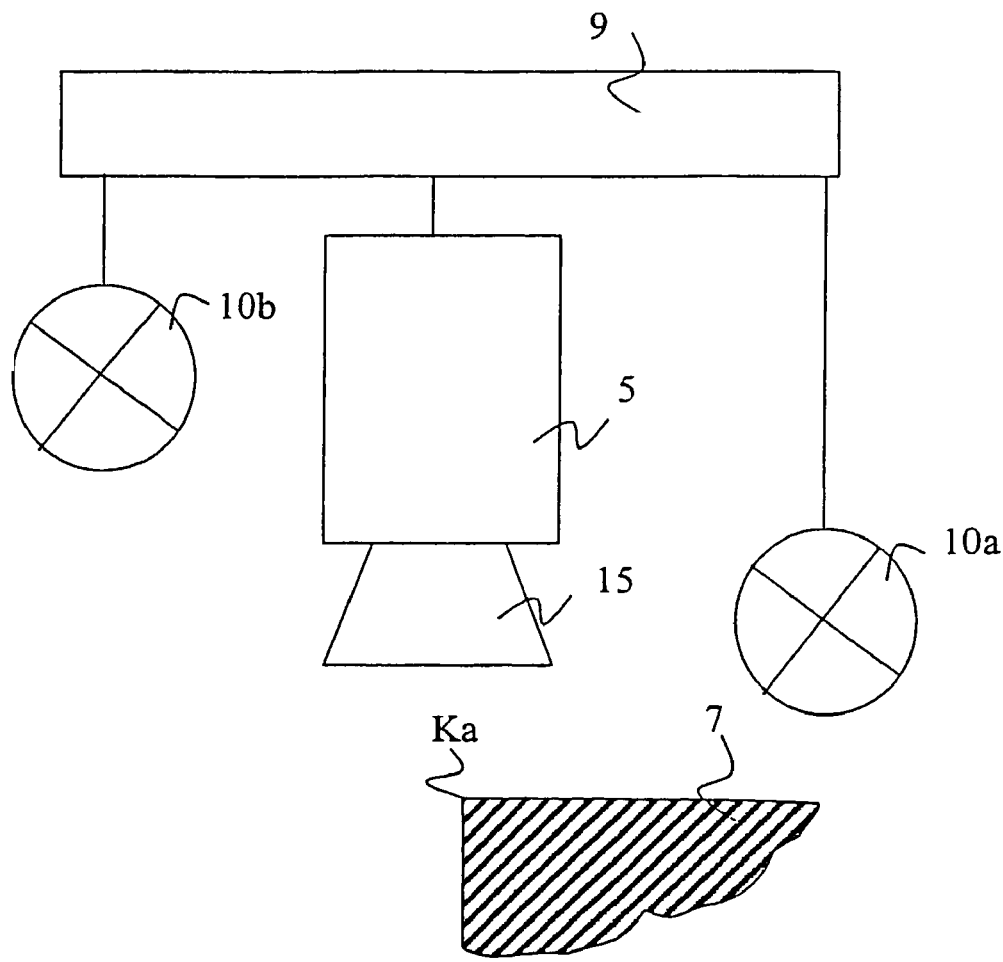
FIG. 2 is a schematic representation of a measuring assembly for optically measuring a workpiece.
Figure 3A:
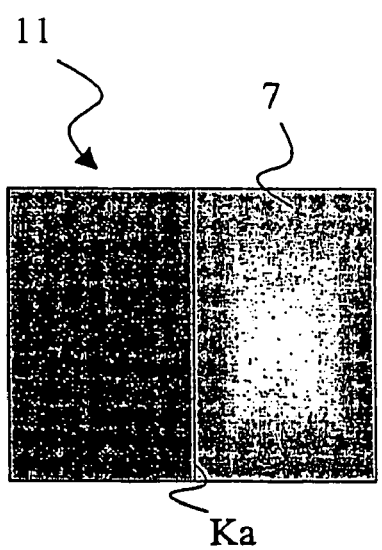
FIG. 3a is a schematic representation of a video image which was recorded with the measurement assembly of FIG. 2.
Figure 3B:
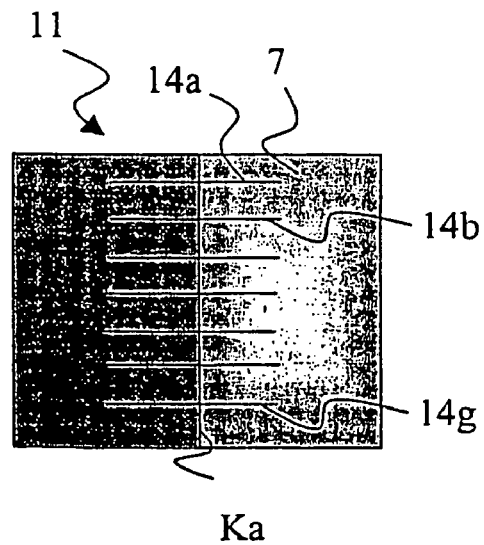
FIG. 3b is the video image of FIG. 3a wherein evaluation lines 14a, 14b . . . 14g are inserted.

The scanning of a workpiece 7 with a video camera is shown here in connection with FIGS. 2, 3a and 3b.

FIG. 2 shows essential components which are necessary for carrying out the method of the invention. The workpiece 7 to be measured is shown on which the edge Ka is to be measured by way of example. The edge Ka is viewed by the video camera 5. The workpiece 7 is illuminated by two light sources or illuminators 10a and 10b. In principle, also one illuminator is sufficient. Likewise, even more than two illuminators can be provided. The video camera 5 as well as the illuminators (10a, 10b) are connected to the computer 9. In addition to a series of other functions, the computer 9 can change, inter alia, the brightness of the illuminators (10a, 10b) as well as adjust the focus of the objective and evaluate the image data recorded by the video camera 5.

In FIG. 3a, an image 11 of the video camera 5 is shown likewise schematically. As shown in FIG. 3a, the surface of the workpiece 7 can be seen illuminated by the illuminators 10a and 10b in the right-hand region of the image 11. In contrast, the image is dark left of the edge Ka. As initially mentioned herein, the illumination with incident light emphasizes the structures on the surface of the workpiece 7 to be measured so that no symmetrical intensity courses develop.

FIG. 3b likewise shows the image 11 of the video camera 5 according to FIG. 3a. So-called evaluation lines (14a, 14b . . . 14g) are shown along the edge Ka whose precise function will be explained hereinafter.

Figure 4:
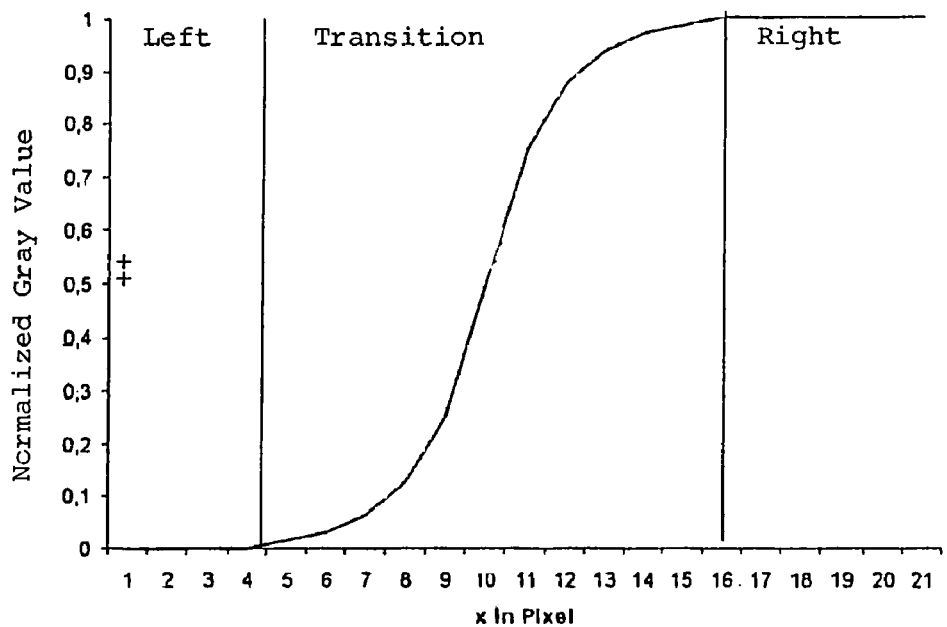

In FIG. 4, the intensity course or the gray value course is shown in the region of edge Ka along the evaluation line 14a at high resolution. From this intensity course of the imaged edge, ancillary parameters can be derived which clearly describe the target quantities of the optical precision measurement in order to derive therefrom control parameters for the influence quantities of the target quantities.

The procedure with respect to the foregoing will now be explained in greater detail for different influence quantities.

Control of the Illumination

A first complex of influence quantities of the target quantity "resulting site deviation" are influence quantities which affect the illumination of the workpiece. Influence quantities of this kind, for which control parameters are to be determined, are, for example, the wavelengths λ with which the illuminators 10a and 10b illuminate the workpiece, the location of the illuminators 10a and 10b and especially the brightness of the illuminators 10a and 10b.

For example, for the above, the contrast, the mean brightness and the disturbance signal amplitude in the region of the structure transition of the edge Ka can be used. The target quantities are, on the one hand, the reliability and robustness when scanning the image (that is, whether a repeated scanning of the workpiece supplies reproducible, purposeful results) and, on the other hand, the resulting site deviation in the position determination. As a target quantity, which implicitly unites the just-mentioned target quantities, the 2D structure site can especially be mentioned. If, as described in greater detail hereinafter, the distance between the sensor (here the video camera 5) and the workpiece surface is determined, also the 3D structure site can be mentioned as a target quantity.

For determining the control data, the courses of the ancillary parameters first have to be determined in dependence upon one or several influence quantities as will be shown in the following strictly by way of example for the influence quantity "brightness" of the illuminators 10a and 10b.

For the above, first the parameter set of the reflection and transmission characteristics $p_{bdrf}$, which can also be characterized as bi-directional reflectance function, has to be determined via variation of all illuminator combinations and intensity evaluations in the image and this takes place via the following equations 1 and 2:

Equation 1:
$$p_{brdf_{li_{L_k}}}(\Theta_S, \Xi_S; \Theta_{L_k}, \Xi_{L_k}; \lambda_{L_k}; E_{L_k}) = \frac{I_{li_{L_k}}(\Theta_S, \Xi_S; \Theta_{L_k}, \Xi_{L_k}; E_{L_k}; \lambda_{L_k}) - I_{a_{li}}}{E_{L_k}(\Theta_{L_k}, \Xi_{L_k}; \lambda_{L_k})}$$

wherein:

$E_{L_k}$=illumination intensity function of the illuminator $L_k$;

$p_{brdf_{li_{L_k}}}$=bi-directional reflectance function for a point left of the edge Ka;

$I_{li_{L_k}}$=total intensity function for a point to the left of the edge Ka, which results because of the intensity $I_{a_{li}}$ of the constant ambient brightness and the intensity because of the illuminator $L_k$;

$I_{a_{li}}$=constant intensity based on the ambient brightness to the left of the edge Ka;

k=number of the particular illuminator;

$L_k$=illuminator number k, here the illuminator 10a or 10b;

$\lambda_{L_k}$=wavelength with which the illuminator $L_k$ illuminates;

$\Theta_S$=azimuth angle of the sensor, here, the video camera 5;

$\Xi_S$=elevation angle of the sensor, here, the video camera 5;

$\Theta_{L_k}$=azimuth angle of the illuminator $L_k$, here, therefore illuminator 10a or 10b; and, $\Xi_{L_k}$=elevation angle of the illuminator $L_k$, here the illuminator 10a or 10b.

Equation 2:
$$p_{brdf_{re_{L_k}}}(\Theta_S, \Xi_S; \Theta_{L_k}, \Xi_{L_k}; \lambda_{L_k}; E_{L_k}) = \frac{I_{re_{L_k}}(\Theta_S, \Xi_S; \Theta_{L_k}, \Xi_{L_k}; E_{L_k}; \lambda_{L_k}) - I_{a_{re}}}{E_{L_k}(\Theta_{L_k}, \Xi_{L_k}; \lambda_{L_k})}$$

wherein:

$p_{brdf_{re_{L_k}}}$=bi-directional reflectance function for a point to the right of the edge Ka;

$E_{L_k}$=illumination intensity function of the illuminator $L_k$;

$I_{re_{L_k}}$=total intensity function of an image point to the right of the edge Ka which results because of the intensity $I_{a_{re}}$ of the constant ambient brightness and the intensity because of the illuminator $L_k$; and, $I_{a_{re}}$=constant intensity based on the ambient brightness to the right of the edge Ka.

The remaining symbols correspond to the symbols of equation 1.

Figure 5:
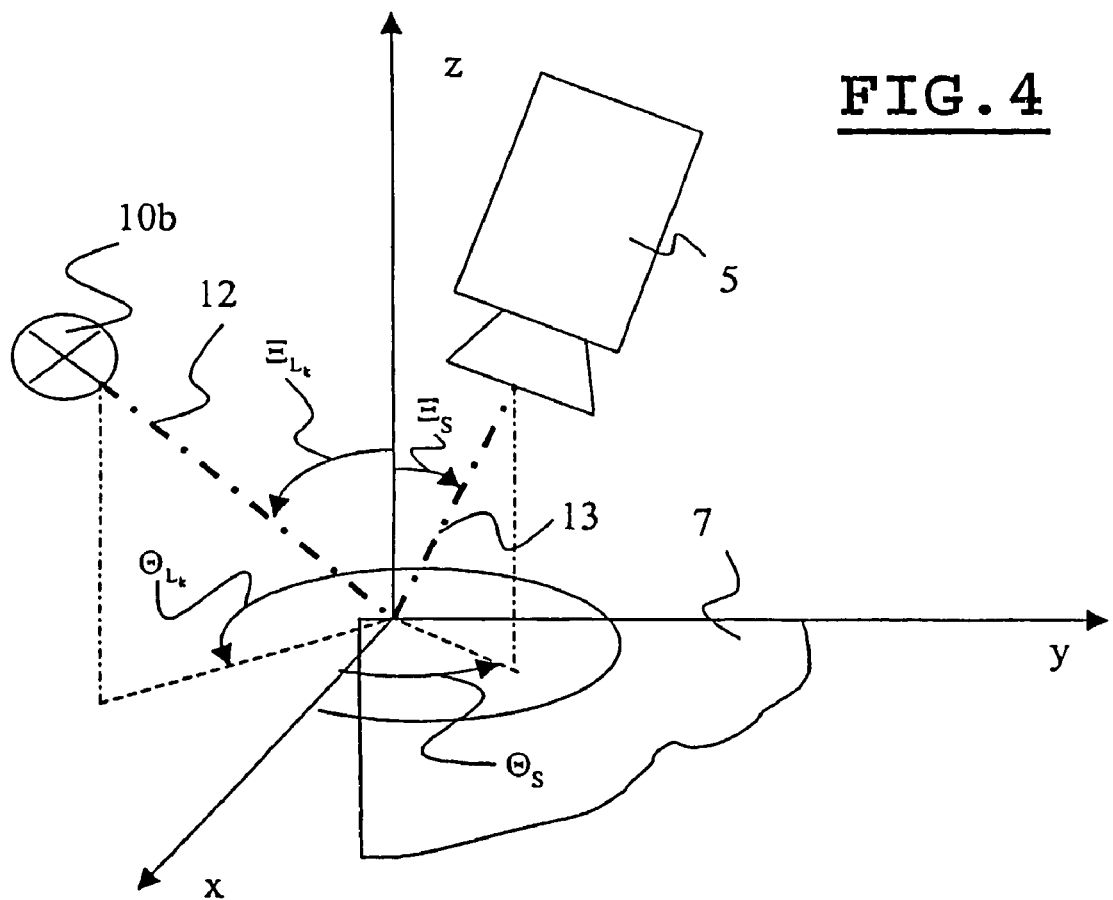
FIG. 5 is a schematic of the angle conditions between light source 10b and video camera 5.

The azimuth angle $\Theta_S$ and the elevation angle $\Xi_S$ of the video camera 5 as well as the azimuth angle $\Theta_{L_k}$ and elevation angle $\Xi_{L_k}$ of the illuminator $L_k$ (illuminator $L_k$ is here the illuminator 10b by way of example) are explained briefly with respect to FIG. 5 even though these angles are of no consequence in connection with the embodiment described further hereinafter. As seen in FIG. 5, these are the spherical coordinate angles of a light beam 12 and 13 transmitted by the light source 10b, which is reflected by a point to be evaluated on the surface of the workpiece 7. The origin of the coordinate system (x, y, z) is in this point, which is to be evaluated, of the surface of the workpiece.

According to equation 1, the bi-directional reflectance function $p_{brdf_{li \, Lk}}$ is determined for a point to the left of the edge K; whereas equation 2 determines the bi-directional reflectance function $p_{brdf_{li \, Lk}}$ for a point to the right of the edge K.

In a practical realization, the parameter matrix $p_{bdrf}$ of the influences of the individual illumination sources on the region, which is to be investigated, is determined (bi-directional reflectance function) with the aid of the controllable light sources or illuminators 10a and 10b and with the image processing system which is formed by the computer 9.

One proceeds as described below in order to be able to determine the bi-directional reflectance function for a point on the workpiece surface either to the left of the edge or to the right of the edge.

First, the site of the edge Ka has to be determined in the image 11. For this purpose, the image 11 of the edge Ka is recorded in accordance with FIGS. 3a and 4 with an arbitrary brightness setting of the illuminators 10a and 10b. From these image data, the location of the edge Ka is coarsely determined via an edge site criterion. It is of no consequence that the position of the edge Ka can only be determined imprecisely because the influence quantities cannot be optimally adjusted. Proceeding from the determined position of the edge Ka, a predefined number of image points or pixels of the image are defined as a transition region on both sides of the edge Ka. All of the pixels of image 11 outside of the transition region on the one side of the edge Ka are defined as left of the edge Ka. All image points or pixels of the image 11 outside of the transition region on the other side of the edge Ka are defined as to the right of the edge Ka as shown in FIG. 4. It is understood that the characterizations left and right are purely arbitrary and are only selected for the purpose of explanation.

In addition, and by way of example, the evaluation lines 14a, 14b . . . 14g are computed evenly distributed along the course of the edge Ka as shown in FIG. 3b. These evaluation lines are only computed for the reason that artificially defined image regions are generated along which the particular image points of the image 11 can be evaluated in order to not be required to evaluate all image points of the image 11. It is understood that these evaluation lines do not have to be evenly distributed; rather, the spacing of the lines can be varied as desired. Alternatively, and if this is wanted, all image points could be evaluated and the lines are then not necessary.

In the next step, all illuminators 10a and 10b are switched off and an image is again recorded by the video camera 5. By measuring color values or gray values in image regions to the right or to the left of the edge Ka, the intensities $I_{a_{li}}$, $I_{a_{re}}$ can be determined for the particular image region to be evaluated based on the ambient brightness to the left or to the right of the edge Ka.

Thereafter, the brightness and therefore the illuminating intensity is increased separately for each illuminator 10a and 10b and, for each adjusted illumination intensity, an image 11 is recorded anew by the video camera 5. By measuring color values or gray values in the image regions to the right or to the left of the edge Ka, the total intensities to the left or to the right of the edge Ka can be measured for each image region which is to be evaluated. These total intensities result from the intensity $I_{a_{li}}$ or $I_{a_{re}}$ of the constant ambient brightness, and the intensity because of the illuminator $L_k$, respectively. If one views the adjusted brightness as function values for the illumination intensity function $E_{L_k}$ of the particular illuminator and the measured total intensities as function values of the total intensity function $I_{li_{Lk}}$ and $I_{re_{Lk}}$, then the bi-directional reflectance functions $p_{brdf_{li\ Lk}}$ and $p_{brdf_{li\ Lk}}$ can be determined by equations 1 or 2.

From the relationship according to equation 1, the function of the total intensity $I_{li}$ to the left of the edge site (which results from the intensity $I_{a_{li}}$ of the ambient brightness and the sum of the intensity functions of the individual illuminations k=1 . . . n) is shown as follows:

Equation 3:
$$I_{re}(\Theta_S, \Xi_S; \Theta_L, \Xi_L; E_L; \lambda_L) = I_{a_{re}} + \sum_{k=1}^{n} \left[ E_{L_k}(\Theta_{L_k}, \Xi_{L_k}; \lambda_{L_k}) \cdot p_{brdf_{re_{L_k}}}(\Theta_S, \Xi_S; \Theta_{L_k}, \Xi_{L_k}; \lambda_{L_k}; E_{L_k}) \right]$$

The function of the total intensity $I_{re}$ for an image region to the right of the edge site is shown in the same way as follows:

Equation 4:
$$I_{li}(\Theta_S, \Xi_S; \Theta_L, \Xi_L; E_L; \lambda_L) = I_{a_{li}} + \sum_{k=1}^{n} \left[ E_{L_k}(\Theta_{L_k}, \Xi_{L_k}; \lambda_{L_k}) \cdot p_{brdf_{li_{L_k}}}(\Theta_S, \Xi_S; \Theta_{L_k}, \Xi_{L_k}; \lambda_{L_k}; E_{L_k}) \right]$$

While considering the equations 3 and 4, a contrast function according to equation 5 can be computed from the recorded parameters as follows:

Equation 5:
$$K(\Theta_S, \Xi_S; \Theta_L, \Xi_L; E_L; \lambda_L) = |I_{li}(\Theta_S, \Xi_S; \Theta_L, \Xi_L; E_L; \lambda_L) - I_{re}(\Theta_S, \Xi_S; \Theta_L, \Xi_L; E_L; \lambda_L)|$$
$$= \left| I_{a_{li}} + \sum_{k=1}^{n} [E_{L_k}(\Theta_{L_k}, \Xi_{L_k}, \lambda_{L_k}) \cdot p_{brdf_{li_{L_k}}}(\Theta_S, \Xi_S; \Theta_{L_k}, \Xi_{L_k}; \lambda_{L_k}; E_{L_k})] - \right.$$
$$\left. \{ I_{a_{re}} + \sum_{k=1}^{n} [E_{L_k}(\Theta_{L_k}, \Xi_{L_k}, \lambda_{L_k}) \cdot p_{brdf_{re_{L_k}}}(\Theta_S, \Xi_S; \Theta_{L_k}, \Xi_{L_k}; \lambda_{L_k}; E_{L_k})] \} \right|$$
$$= \left| I_{a_{li}} - I_{a_{re}} \right| + \sum_{k=1}^{n} [E_{L_k}(\Theta_{L_k}, \Xi_{L_k}; \lambda_{L_k})] \cdot$$
$$| p_{brdf_{li}}(\Theta_S, \Xi_S; \Theta_{L_k}, \Xi_{L_k}; \lambda_{L_k}; E_{L_k}) - p_{brdf_{re}}(\Theta_S, \Xi_S; \Theta_{L_k}, \Xi_{L_k}; \lambda_{L_k}; E_{L_k}) |$$

While considering equations 3 and 4, a function of the mean brightness $\bar{I}$ according to the following equation 6 can be computed from the recorded parameters:

$$\bar{I}(\Theta_S, \Xi_S; \Theta_L, \Xi_L; E_L; \lambda_L) = \frac{I_{li}(\Theta_S, \Xi_S; \Theta_L, \Xi_L; E_L; \lambda_L) + I_{re}(\Theta_S, \Xi_S; \Theta_L, \Xi_L; E_L; \lambda_L)}{2}$$
$$= \frac{1}{2}[I_{a_H} + I_{a_{re}}] + \sum_{k=1}^{n} [E_{L_k}(\Theta_{Lk}, \Xi_{Lk}; \lambda_{Lk})] *$$
$$\left| p_{brdf_{li_{L_k}}}(\Theta_S, \Xi_S; \Theta_{L_k}, \Xi_{L_k}; \lambda_{L_k}; E_{L_k}) + p_{brdf_{re_{L_k}}}(\Theta_S, \Xi_S; \Theta_{L_k}, \Xi_{L_k}; \lambda_{L_k}; E_{L_k}) \right|$$

Furthermore, a homogeneity function according to the following equations 7 to 9 can be computed:

Equation 7:

$$H_{li}(\Theta_S; \Xi_S; \Theta_L; \Xi_L; E_L; \lambda_L) = \frac{\sum_{s=1}^{m-1} |I_{li_s}(\Theta_S, \Xi_S; \Theta_L, \Xi_L; E_L; \lambda_L) + I_{li_{s-1}}(\Theta_S, \Xi_S; \Theta_L, \Xi_L; E_L; \lambda_L)|}{m-1}$$

$$= \frac{1}{m-1} \{ \sum_{k=1}^{n} [E_{L_k}(\Theta_{L_k}, \Xi_{L_k}; E_{L_k}; \lambda_{L_k})] *$$

$$\sum_{s=1}^{m-1} |p_{brdf_{li_s}}(\Theta_S, \Xi_S; \Theta_{L_k}, \Xi_{L_k}; E_{L_k}; \lambda_{L_k}) +$$

$$p_{brdf_{li_{s-1}}}(\Theta_S, \Xi_S; \Theta_{L_k}, \Xi_{L_k}; E_{L_k}; \lambda_{L_k})| \}$$

wherein:
$H_{li}$=homogeneity function left of the edge Ka;
s=the number of the evaluation lines 14a, 14b . . . 14g;
m=the total number of evaluation lines 14a, 14b . . . 14g;
$I_{li_s}$=the total intensity function according to equation 3, however, only for image points on the particular evaluation lines s, which lie to the left of edge Ka;
$p_{brdf_{li_s}}$=the bi-directional reflectance function according to equation 1, however, only for image points on the particular evaluation lines s, which lie to the left of the edge Ka.

Equation 8:

$$H_{re}(\Theta_S; \Xi_S; \Theta_L; \Xi_L; E_L; \lambda_L) = \frac{\sum_{s=1}^{m-1} |I_{re_s}(\Theta_S, \Xi_S; \Theta_L, \Xi_L; E_L; \lambda_L) + I_{re_{s-1}}(\Theta_S, \Xi_S; \Theta_L, \Xi_L; E_L; \lambda_L)|}{m-1}$$

$$= \frac{1}{m-1} \{ \sum_{k=1}^{n} [E_{L_k}(\Theta_{L_k}, \Xi_{L_k}; E_{L_k}; \lambda_{L_k})] *$$

$$\sum_{s=1}^{m-1} |p_{brdf_{re_s}}(\Theta_S, \Xi_S; \Theta_{L_k}, \Xi_{L_k}; E_{l_k}; \lambda_{L_k}) +$$

$$p_{brdf_{re_{s-1}}}(\Theta_S, \Xi_S; \Theta_{L_k}, \Xi_{L_k}; E_{L_k}; \lambda_{L_k})| \}$$

wherein:
$H_{re}$=homogeneity function to the right of edge Ka;
s=the number of one of the evaluation lines 14a, 14b . . . 14g;
m=the total number of the evaluation lines 14a, 14b . . . 14g;
$I_{re_s}$=the total intensity according to equation 4, however, only for image points on the particular evaluation line s, which lie to the right of edge Ka;
$p_{brdf_{re_s}}$=the bi-directional reflectance function according to equation 1, however, only for image points on the particular evaluation line s which lie to the right of the edge Ka.

$$H(\Theta_S; \Xi_S; \Theta_L; \Xi_L; E_L; \lambda_L) = H_{li}(\Theta_S; \Xi_S; \Theta_L; \Xi_L; E_L; \lambda_L) = H_{re}(\Theta_S; \Xi_S; \Theta_L; \Xi_L; E_L; \lambda_L)$$

wherein:
H=the total homogeneity function;
$H_{li}$=homogeneity function to the left of the edge Ka according to equation 7; and,
$H_{re}$=homogeneity function to the right of the edge Ka according to equation 8.

Attention is called to the fact that equations 1 to 4 each apply only for one image point of the image 11. Even though the subsequent evaluation according to equations 5 to 9 (which build upon the equations 1 to 4) would in principal be possible with such individual image points, the evaluations are actually undertaken within the image 11 for a multiplicity of image points on the evaluation lines 14a . . . 14g because of the scattering of the color values and these results are then averaged, for example, arithmetically. In the case of equations 5 and 6, the functions of the total intensity $I_{li}$ of equations 1 and 3 are first undertaken for a plurality of image points on the evaluation lines 14a . . . 14g to the left of the edge site and these are then averaged. In the same way, the functions of total intensity $I_{re}$ of equations 2 and 4 are undertaken for a multiplicity of image points on the evaluation lines 14a . . . 14g to the right of the edge site and these are then averaged. With these averaged total intensities, the contrast function and the function of the mean intensity can be computed in accordance with the relationships of equations 5 and 6.

For the equations 7 to 9, the same procedure applies and the total intensities $I_{li}$ and $I_{re}$ are each averaged only for the image points of a particular evaluation line s (evaluation lines 14a . . . 14g).

With the computation of the contrast function, the function of the mean brightness and of the homogeneity function, parameters were determined in dependence upon an influence quantity, namely, the brightness of the illuminators 10a and 10b. However, these parameters can not all be used directly as ancillary parameters because the contrast function exhibits a maximum with an optimum of the illumination brightness, the function of the mean brightness exhibits no extremum whatsoever and the homogeneity function exhibits a minimum for an optimum of the illumination brightness. So that the determined courses of the parameters can be used further as ancillary parameters in the sense of the invention, they must be so determined that the courses have a like extremum of the functional dependency from the influence quantity, that is, either all courses exhibit a maximum in the optimum of the illumination brightness or all courses exhibit a minimum in the optimum of the illumination brightness. So that this is possible, a like extremum of the functional dependency from the influence quantity can take place via difference formation of a determined value with an input value.

For the contrast function, the course of an ancillary parameter can be determined as follows:

$$K_{max} - K(\Theta_S, \Xi_S; \Theta_L, \Xi_L; E_L; \lambda_L)$$

wherein $K_{max}$ is the maximum possible contrast.

For the function of the mean brightness, the course of an ancillary parameter can be determined as follows:

$$(I_{max}/2) - \bar{I}(\Theta_S, \Xi_S; \Theta_L, \Xi_L; E_L; \lambda_L)$$

wherein $I_{max}$ is the maximum possible intensity.

For the homogeneity function, the course of an ancillary parameter can be determined as follows:

$$H(\Theta_S, \Xi_S; \Theta_L, \Xi_L; E_L; \lambda_L)$$

The ancillary parameters, which are necessary for the optimization of the target quantities, were synthetically determined from the image regions while utilizing the parameter matrix $P_{bdrf}$ and the illumination combinations.

In the next step, the total course of the ancillary parameters is determined in dependence upon the influence quantity "illumination brightness" via weighted summation of the traces of the ancillary parameters and, in a next step, an extremum is determined which is here the minimum of the total course of the ancillary parameters, as shown purely schematically.

The formulation of the target function to be optimized can generally be formulated as follows:

$$F_k*(K_{max}-\text{contrast})+F_I*|(I_{max}/2)-\text{mean brightness}|+F_H*\text{homogeneity}\rightarrow\min$$

With the specific courses of the ancillary parameters, which were determined as described above, the optimization criterion is set up as follows:

$$F_K*(K_{max}-K(\Theta_S,\Xi_S;\Theta_L,\Xi_L E_L;\lambda_L))+F_I((I_{max}/2)-I((\Theta_S,\Xi_S;\Theta_L,\Xi_L E_L;\lambda_L))+F_H*(\Theta_S,\Xi_S;\Theta_L,\Xi_L E_L;\lambda_L)\rightarrow\min$$

wherein:

$F_K$=valuation factor for the weighted valuation of the ancillary parameter $(K_{max}-K(\Theta_S,\Xi_S;\Theta_L,\Xi_L E_L;\lambda_L))$;

$F_I$=valuation factor for the weighted valuation of ancillary parameter $((I_{max}/2)-I(\Theta_S,\Xi_S;\Theta_L;E_L\lambda_L))$;

$F_H$=valuation factor for the weighted valuation of the ancillary parameter $H(\Theta_S,\Xi_S;\Theta_L,E_L;\lambda_L)$ The factors $F_K$, $F_I$ and $F_H$ function for the different valuation of the characteristics of the image section. These factors are selectable depending upon the applied edge site criterion. The method described here functions for every type and number of illuminating sources. In the result of the optimization, one obtains the adjustments of each individual light source or a combination of light sources.

The determination of the extremum, here of the minimum, takes place according to the methods known from mathematics. For example, the Simplex method can be applied.

In a last step, the corresponding values of the influence quantities, that is, the illumination brightnesses $E_{L_k}$ of the illuminators 10a and 10b at the site of the determined extremum are adjusted as control data for this influence quantity, that is, determined as an illumination brightness to be adjusted. This illumination brightness is adjusted in accordance with the control data.

In an especially advantageous embodiment of the method, the recordation of an image sequence by a camera can take place with a synchronized controllable illuminating source. The illumination adjustment is changed between the images of the sequence. This procedure affords the special advantage compared to the above-described procedure that the image data, which are necessary for determining the course of the ancillary parameters, can be recorded very rapidly.

A further advantageous configuration of the here-described method for maximizing the detection reliability and minimizing the position deviation is possible when the image data is obtained via the synthetic generation of image scenes by simulation. For this purpose, the knowledge as to the reflection and transmission characteristics of the materials, the type of edge transition and the illuminating conditions is required. In this case, the image data in accordance with FIGS. 3a and 4 would be simulated and from this, the parameter set of reflection characteristics and transmission characteristics $p_{bdrf}$ (which is also characterized as bi-directional reflectance function) would be determined purely mathematically via the method of computer simulation.

This embodiment of the method makes use of the known methods of the computer graphics and the optimization. Known illuminating models of the computer graphics are, for example, the Ray tracing method and the Radio City method.

Control of the Focus

For a correct geometric determination on three-dimensional measuring objects, in addition to the lateral two-dimensional image information, also the spatial orientation as to the distance data is necessary, that is, the distance between the video camera and the surface of the workpiece. This distance data can be obtained with the aid of focus methods. The determined focus site is therefore mentioned as target quantity of this optimization. An essential influence quantity is the lens position of the objective 15 of the video camera 5 with which the focus can be adjusted. To control this influence quantity "lens position", in the past, the lens position of the objective 15 of the video camera 5 was moved through from one end position to the other end position and the courses of the ancillary parameters were determined from the image data recorded thereby. These ancillary parameters were characterized as focus criteria. A conclusion as to the suitable lens position was then drawn from a determined extremum of the course of such an ancillary parameter, that is, the focus criterion.

The courses of ancillary parameters or criteria for focusing utilized in practice, such as the course of the contrast, the course of the gray value differences or the course of the mean value and of the standard deviation are greatly dependent upon the illuminating conditions and the optical characteristics of the measurement objects. Therefore, a very robust criterion for all types of measurement objects is necessary in order to make possible a simple operation of the apparatus and a reliable operation of automatic measurement sequences.

However, since each of the focus criteria or more precisely stated the course of each of the focus criteria responds with a different amplitude difference to the same measurement object or workpiece, this is not possible for an individual focus criterion. Amplitude difference is understood to be the maximum change of the value of the particular focus criterion when moving through the lens position of the objective 15 from one end position to the other end position.

Figure 6:
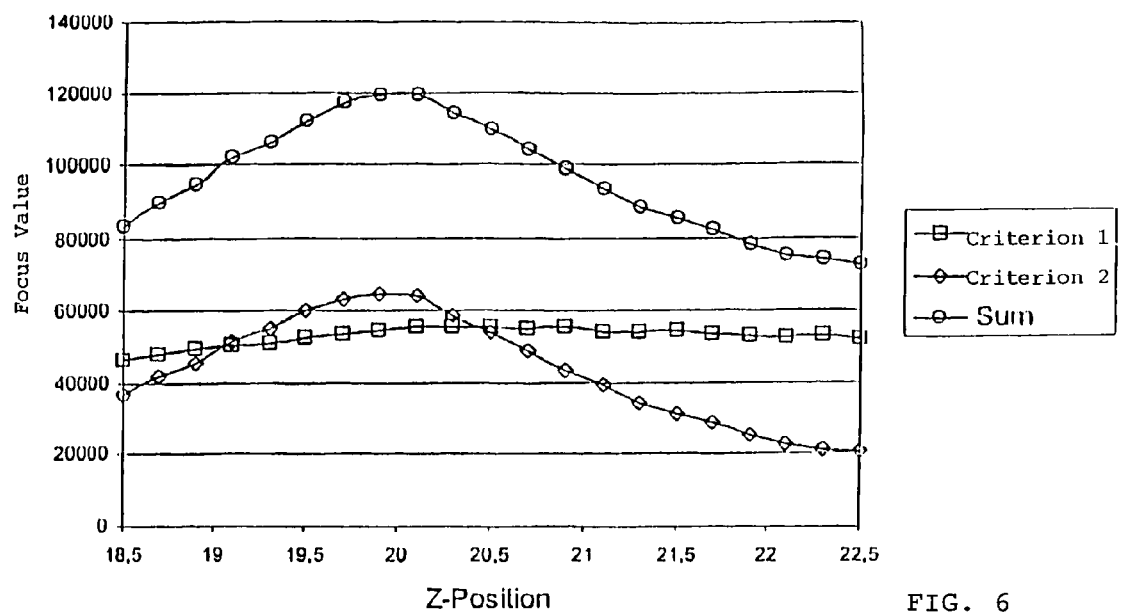
FIG. 6 is a purely schematic representation of the course of two focus criteria; and, FIG. 7 is a schematic representation of the course of two edge criteria.

An alternative is presented by the weighted addition of the courses of the ancillary parameters (focus criteria) to a total course of the ancillary parameters. The accent of this focus curve can be very different as shown by way of example in FIG. 6. As shown in FIG. 6, two courses of ancillary parameters are shown and identified by criterion 1 and criterion 2. A universal response to many measurement objects can be achieved via such a combination of several courses of focus criteria via weighted addition to a total course which, in FIG. 6, is identified by "sum". As shown in FIG. 6, the course of the ancillary parameter "criterion 1" shows virtually no amplitude difference; whereas, the course of the ancillary parameter "criterion 2" shows a relatively large amplitude difference. With weighted summation, the total course of the ancillary parameters (which is identified in FIG. 6 by "sum") receives a very large amplitude difference. In another workpiece or for different illuminating conditions, it is, in contrast, possible that oppositely, the ancillary parameter "criterion 1" shows a large amplitude difference; whereas, the ancillary parameter "criterion 2" shows virtually no amplitude difference. With the weighted summation, however, the total course of the ancillary parameters exhibits a large amplitude difference which can be evaluated notwithstanding the completely different courses of the ancillary parameters "criterion 1" and "criterion 2".

In this way, a more robust detection of the focus state is possible.

The target function, which is to be optimized, can be defined as follows:

$$F_1*\text{Focusvalue}_1+F_2*\text{Focusvalue}_2+\ldots F_N*\text{Focusvalue}_N \rightarrow \max$$

wherein:

Focusvalue$_1$=course of a first ancillary parameter or focus criterion (for example, contrast) in dependence upon the influence quantity (for example, lens position of the objective 15);

Focusvalue$_2$=course of a second ancillary parameter or focus criterion (for example, gray value difference) in dependence upon the influence quantity (for example, lens position of the objective 15);

Focusvalue$_N$=course of a last ancillary parameter or focus criterion in dependence upon the influence quantity (for example, lens position of the objective 15);

$F_1$=weighting factor for the weighted valuation of the ancillary parameter Focusvalue$_1$;

$F_2$=weighting factor for the weighted valuation of the ancillary parameter Focusvalue$_2$;

$F_N$=weighting factor for weighted valuation of ancillary parameter Focusvalue$_n$.

There are especially different possibilities in order to determine weighting factors $F_1, F_2 \ldots F_n$ for the criteria. For example, this can take place based on the materials, the edge type or, adaptively, based on the gradient of the focus functions of the individual focus methods.

The distance between the video camera 5 and the surface of the workpiece 7 should be measured, preferably, at the 2D structure site, which is to be determined, via the focus site. For this reason, image points to the right of the edge Ka are used to determine the focus criteria. The image points lie on the surface of the workpiece 7 and are disposed in the region of the edge Ka, preferably on a scan line (14a to 14g), which is evaluated for determining the structure site.

Objectivated Edge Site Criterion

The primary task of the optical precision measuring technology is the precise position determination of the optically effective structure and the assignment to the function-determining body edges and geometric features so that, as target quantity, the 2D structure site is to be determined or, if additionally the distance between camera and workpiece surface is measured, the 3D structure site is to be determined.

For this purpose, different ancillary parameters are available and are here characterized as edge site criteria such as, for example, differential, integral and threshold value criteria. The measuring uncertainty of each edge site criterion is dependent upon the particular intensity transition. The adjustment of the best suitable edge site criterion is, accordingly, associated with much experience of the measuring technician. Robust scanning strategies and automatic selection methods for edge site criteria are required which react to different objects and respond reliably. When the structure site has been found with high reliability, then a precision scanning with subpixel resolution can be carried out in the next step.

Figure 7:
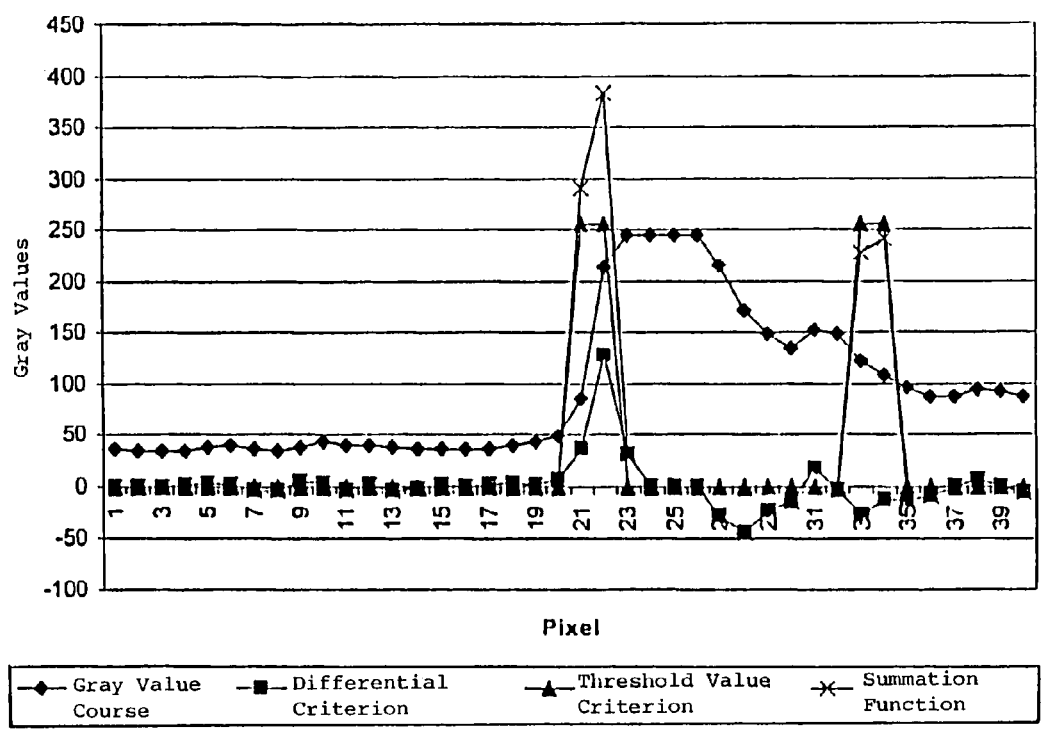

As already set forth above, the primary problems of the detection of the intensity transition occur with the illumination with incident light. This type of illumination emphasizes the structures on the surface so that no symmetrical intensity courses arise. This becomes clear from strong intensity fluctuations in the "bright" areas of the intensity course as is shown in FIG. 7 with respect to the curve identified as gray-value course. This gray-value course could, for example, have been recorded along an evaluation line 14b of the image 11 of FIG. 3b. In contrast to the above example, wherein influence quantities for the illumination were evaluated and therefore the image points in the transition region of the structure were not evaluated, all image points of the affected evaluation line 14b are here considered in the determination of the structure site or of the edge site of the edge Ka because the 2D structure site, which is to be determined (that is, the edge site of the edge Ka) is disposed precisely in this transition region of the edge Ka.

From this gray value trace, the course of several ancillary parameters (which are here characterized as edge site criteria) are determined, namely, a differential edge site criterion and a threshold value criterion. As influence quantity, the potential structure site of the edge Ka can be mentioned which here corresponds to a site or an image point on the evaluation line 14b.

The differential edge site criterion forms the gray value differences, that is, the differences of the gray values of mutually adjacent image points and determines the maximum gradient from the magnitude of the function. Since the gray value course exhibits a relatively large noise, it is accidental because of the noise where the greatest gray value difference occurs as shown by the curve identified as "differential criterion" in FIG. 7. The measurement uncertainty for the scanning is thereby greater.

The threshold value criterion determines the gray value of the individual image points and selects all image points in the example shown here whose gray value lies between 100 and 128 GW. For all image points whose gray value lies between 100 and 128 GW, the threshold value criterion takes on the value 255 GW; whereas, for all other image points, the threshold value criterion assumes the value 0 GW. In this way, the course of the ancillary parameter "threshold value criterion" has a digital course. The course of this ancillary parameter is shown in FIG. 7 as the curve having the identification "threshold value criterion". As a consequence of the noise of the gray values of the image (see curve "gray value course" in FIG. 7), it is likewise not always possible to have a clear detection of the edge site.

From the weighted addition of the two courses, the optimizing target function (that is, the total course of the ancillary parameters) arises and is identified in FIG. 7 as "summation function". Here, the detection of the maximum gradient is possible with higher reliability. In the case shown here, the weighting factors are both equal to one. The target function to be optimized can be formulated as follows:

$$F_1*\text{Edgesitecriterion}_1+F_2*\text{Edgesitecriterion}_2+\ldots F_N*\text{Edgesitecriterion}_N \rightarrow \max$$

wherein:

Edgesitecriterion$_1$=course of a first ancillary parameter or edge site criterion (for example, differential edge site criterion) in dependence upon the influence quantity (for example, potential structure site);

Edgesitecriterion$_2$=course of a second ancillary parameter or edge site criterion (for example, threshold value criterion) in dependence upon the influence quantity (for example, potential structure site);

Edgesitecriterion$_N$=course of a last ancillary parameter or focus criterion in dependence upon the influence quantity (for example, potential structure site);

$F_1$=valuation factor for the weighting valuation of the ancillary parameter "Edgesitecriterion$_1$";

$F_2$=valuation factor for the weighting valuation of the ancillary parameter "Edgesitecriterion$_2$"; and, $F_N$=valuation factor for weighting valuation of the ancillary parameter "Edgesitecriterion$_N$".

The determination of the weighting factors $F_1, F_2, \ldots F_N$ is of great significance here. The most favorable would be an adaptive determination of the weighting factors as well as of the parameters of the edge site criteria.

With a realization of the method described herein, there is a decisive simplification of the optical scanning because the illumination, the focus and the edge site criterion no longer have to be adjusted by the measuring technician.

For the equations 1 to 9, the following apply:

with m>1
E=illuminating intensity;
H=homogeneity;
I=brightness;
Ia=ambient brightness;
K=contrast;
L=illumination intensity;
li=region to the left of the structure transition or the edge K;
re=region to the right of the structure transition or the edge K;
S=sensor;
λ=wavelength;
Θ=azimuth angle; and,
Ξ=elevation angle.

This application claims the benefit of PCT/EP 02/03921, filed Apr. 9, 2002 and the subject matter thereof is incorporated herein by reference.

It is understood that the foregoing description is that of the preferred embodiments of the invention and that various changes and modifications may be made thereto without departing from the spirit and scope of the invention as defined in the appended claims.

What is claimed is:

1. A method for optimizing target quantities for optical precision measuring, the method comprising the steps of:
obtaining ancillary parameters from image data and deriving control data for influence quantities;
determining a weighted summation of the individual ones of said ancillary parameters for a target function to be optimized wherein said target function includes a plurality of focus values each being different from the other; and
determining all ancillary parameters in such a manner that they have a like extremum of the functional dependency of the influence quantities.

2. The method of claim 1, wherein the following are used as said ancillary parameters: contrast, homogeneity, mean brightness and/or gradient.

3. The method of claim 2, wherein the computation of the ancillary parameters takes place based on simulated images which are generated with illumination models of computer graphics.

4. The method of claim 1, wherein the determination of the ancillary parameters takes place via difference forming with an input value with the objective of obtaining a like extremum.

5. The method of claim 1, wherein the weighting factors for the optimization criteria are so computed that a standardization of the individual parameters takes place.

6. The method of claim 1, wherein the determination of the ancillary parameters takes place from each type of color images or gray value images.

7. The method of claim 1, wherein the target quantities of the optimization define 2D structure sites.

8. The method of claim 1, wherein the target quantities of the optimization define the focus site.

9. The method of claim 7, wherein the target quantities of the optimization define the 2D structure site and focus site.

10. The method of claim 1, wherein the target quantities of the optimization define the 3D structure site.

11. The method of claim 1, wherein at least one influence quantity relates to the illumination.

12. The method of claim 11, wherein a parameter set of the reflection characteristics and transmission characteristic $p_{bdfr}$ is first determined for determining the ancillary parameters.

13. The method of claim 1, wherein an image sequence is recorded by a camera with a synchronized controllable illuminating source and the illumination adjustment is changed between the images.

14. A precision measuring apparatus for measuring workpieces, the precision measuring apparatus comprising:
means for obtaining ancillary parameters from image data and deriving control data for influence quantities;
means for determining a weighted summation of the individual ones of said ancillary parameters for a target function to be optimized wherein said target function includes a plurality of focus values each being different from the other; and
means for determining all ancillary parameters in such a manner that they have a like extreme of the functional dependency of the influence quantities.

15. The precision measuring apparatus of claim 14, wherein said precision measuring apparatus is a coordinate measuring apparatus.

16. A method for optimizing target quantities for optical precision measuring wherein ancillary parameters are obtained from image data of a workpiece to be measured and wherein control data is derived from said ancillary parameters for influence quantities of these target quantities, the method comprising deriving the control data with the steps of:
determining the courses of the ancillary parameters in dependence upon at least one influence quantity and determining the courses of the ancillary parameters so that the courses have a like extremum of the functional dependency of the influence quantity;
determining a total course of the ancillary parameters in dependence upon the influence quantity via weighted summation of the courses of the ancillary parameters;
determining an extremum of the total course of the ancillary parameters; and,
determining the corresponding value of the influence quantity at the site of the specific extremum as control datum for the influence quantity.

17. The method of claim 16, wherein the following are used as said ancillary parameters: contrast, homogeneity, mean brightness and/or gradient.

18. The method of claim 17, wherein the determination of the ancillary parameters takes place from simulated image data which are generated with illumination models of computer graphics.

19. The method of claim 16, wherein at least individual ones of said ancillary parameters are determined via difference forming with an input value with the objective of obtaining a like extremum of the functional dependency of said influence quantity.

20. The method of claim 16, wherein the weighting factors for the weighted summation of the courses of the ancillary parameters are so determined that a standardization of all ancillary parameters takes place.

21. The method of claim 16, wherein the determination of the ancillary parameters takes place from color images or gray value images.

22. The method of claim 16, wherein the target quantities define the 2D structure sites and/or focus sites.

23. The method of claim 16, wherein the target quantities define 3D structure sites.

24. The method of claim 16, wherein at least one influence quantity relates to the illumination.

25. The method of claim 24, wherein first a reflectance function $p_{bdfr}$ is determined for determining the course of the ancillary parameters.

26. The method of claim 24, wherein, as image data for determining the course of the ancillary parameters, an image sequence is recorded by a camera with a synchronized illuminating source and the illuminating adjustment is changed between the images.

27. An optical precision measuring apparatus comprising:
an image recording device;
an image processing device connected to said image recording device; and,
said image processing device functioning to obtain ancillary parameters for optimizing target quantities of a measuring sequence of a workpiece to be measured and to derive control data from said ancillary parameters for influence quantities of said target quantities by performing the following steps:
determining the courses of the ancillary parameters in dependence upon at least one influence quantity with the courses of the ancillary parameters being so determined that the courses have a like extremum of the functional dependency from the influence quantity;
determining a total course of the ancillary parameter in dependence upon the influence quantity via a weighted summation of the courses of the ancillary parameters;
determining an extremum of the total course of the ancillary parameters; and,
determining the corresponding value of the influence quantity at the site of the determined extremum as a control data for the influence quantity.

28. The optical precision measuring apparatus of claim 27, wherein said apparatus is a coordinate measuring apparatus including a movable mechanical assembly and said image recording device is mounted on said mechanical assembly so as to be movable thereby relative to a workpiece in the three coordinate directions (x, y, z).

29. The optical precision measuring apparatus of claim 28, wherein said image processing device uses at least one of the following as one of said ancillary parameters: contrast, homogeneity, mean brightness and gradient.

30. The apparatus of claim 27, wherein said image processing device determines the ancillary parameters from simulated images which are generated with illumination models of computer graphics.

31. The apparatus of claim 27, wherein said image processing device determines at least individual ones of said ancillary parameters via difference forming with an input value with the objective of obtaining a like extremum of the functional dependency from said influence quantity.

32. The apparatus of claim 27, wherein said image processing device determines the weighting factors for the weighted summation of the courses of the ancillary parameters so that a standardization of all ancillary parameters takes place.

33. The apparatus of claim 27, wherein said image processing device determines the ancillary parameters from each type of color images or gray value images.

34. The apparatus of claim 27, wherein the target quantities define the 2D structure sites and/or focus sites.

35. The apparatus of claim 27, wherein the target quantities define 3D structure sites.

36. The apparatus of claim 27, wherein at least one influence quantity relates to the illumination.

37. The apparatus of claim 36, wherein a bi-directional reflectance function $p_{bdfr}$ is determined for determining the ancillary parameters.

38. The apparatus of claim 36, wherein, as image data for determining the course of the ancillary parameters, an image sequence is recorded by a camera with a synchronized illuminating source and the illuminating adjustment is changed between the images.

\* \* \* \* \*

UNITED STATES PATENT AND TRADEMARK OFFICE
CERTIFICATE OF CORRECTION

PATENT NO. : 7,254,262 B2
APPLICATION NO. : 10/687914
DATED : August 7, 2007
INVENTOR(S) : Uwe Nehse, Gerhard Linss and Olaf Kuehn It is certified that error appears in the above-identified patent and that said Letters Patent is hereby corrected as shown below:

Column 10:
Line 55: delete

" $$\bar{I}(\Theta_S, \Xi_S; \Theta_L, \Xi_L; \lambda_L) = \frac{I_{li}(\Theta_S, \Xi_S; \Theta_L, \Xi_L; E_L; \lambda_L) + I_{re}(\Theta_S, \Xi_S; \Theta_L, \Xi_L; E_L; \lambda_L)}{2} $$ "

and substitute

-- $$\bar{I}(\Theta_S, \Xi_S; \Theta_L, \Xi_L; E_L; \lambda_L) = \frac{I_{li}(\Theta_S, \Xi_S; \Theta_L, \Xi_L; E_L; \lambda_L) + I_{re}(\Theta_S, \Xi_S; \Theta_L, \Xi_L; E_L; \lambda_L)}{2} $$ -- therefor.

Line 60: delete " $= \frac{1}{2}\left[I_{a_{li}} + I_{a_{re}}\right] + \sum_{k=1}^{n}\left[E_{L_k}\left(\Theta_{Lk}, \Xi_{Lk}; \lambda_{L_k}\right)\right]*$ "

and substitute -- $= \frac{1}{2}\left[I_{a_{li}} + I_{a_{re}}\right] + \sum_{k=1}^{n}\left[E_{L_k}\left(\Theta_{Lk}, \Xi_{Lk}; \lambda_{L_k}\right)\right]*$ -- therefor.

Column 11:
Line 45: delete

" $\sum_{s=1}^{m-1}\left|p_{brdf_{re_s}}\left(\Theta_S, \Xi_S; \Theta_{L_k}, \Xi_{L_k}; E_{l_k}; \lambda_{L_k}\right) + p_{brdf_{re_{s-1}}}\left(\Theta_S, \Xi_S; \Theta_{L_k}, \Xi_{L_k}; E_{l_k}; \lambda_{L_k}\right)\right|\}$ "

and substitute

-- $\sum_{s=1}^{m-1}\left|p_{brdf_{re_s}}\left(\Theta_S, \Xi_S; \Theta_{L_k}, \Xi_{L_k}; E_{L_k}; \lambda_{L_k}\right) + p_{brdf_{re_{s-1}}}\left(\Theta_S, \Xi_S; \Theta_{L_k}, \Xi_{L_k}; E_{L_k}; \lambda_{L_k}\right)\right|\}$ -- therefor.

Line 63: insert -- Equation 9: --.
Line 64: delete

" $H(\Theta_S, \Xi_S; \Theta_L, \Xi_L; E_L; \lambda_L) = H_{li}(\Theta_S, \Xi_S; \Theta_L, \Xi_L; E_L; \lambda_L) = H_{re}(\Theta_S, \Xi_S; \Theta_L, \Xi_L; E_L; \lambda_L)$ "

and substitute

-- $H(\Theta_S, \Xi_S; \Theta_L, \Xi_L; E_L; \lambda_L) = H_{li}(\Theta_S, \Xi_S; \Theta_L, \Xi_L; E_L; \lambda_L) + H_{re}(\Theta_S, \Xi_S; \Theta_L, \Xi_L; E_L; \lambda_L)$ -- therefor.

UNITED STATES PATENT AND TRADEMARK OFFICE
CERTIFICATE OF CORRECTION

PATENT NO. : 7,254,262 B2
APPLICATION NO. : 10/687914
DATED : August 7, 2007
INVENTOR(S) : Uwe Nehse, Gerhard Linss and Olaf Kuehn It is certified that error appears in the above-identified patent and that said Letters Patent is hereby corrected as shown below:

Column 12:
Line 59: delete

" $(I_{max}/2) - \overline{I}(\Theta_S . \Xi_S; \Theta_L, \Xi_L E_l; \lambda_L)$ "

and substitute

-- $(I_{max}/2) - \overline{I}(\Theta_S, \Xi_S; \Theta_L, \Xi_L; E_L; \lambda_L)$ -- therefor.

Column 13:
Line 13: delete "$F_k * (K_{max}\text{-contrast}) + F_I*|(I_{max}/2)\text{-mean brightness}| + F_H*\text{homogeneity} \rightarrow \min$" and substitute -- $F_k* (K_{max}\text{-contrast}) + F_I*|(I_{max}/2)\text{-mean brightness}| + F_H*\text{homogeneity} \Rightarrow \min$ -- therefor.

Line 18: delete

" $F_K *(K_{max} - K(\Theta_S, \Xi_S; \Theta_L, \Xi_L E_L; \lambda_L)) + F_I((I_{max}/2) - \overline{I}(\Theta_S, \Xi_S; \Theta_L, \Xi_L E_L; \lambda_L)) +$ "

and substitute

-- $F_K *(K_{max} - K(\Theta_S, \Xi_S; \Theta_L, \Xi_L; E_L; \lambda_L)) + F_I((I_{max}/2) - \overline{I}(\Theta_S, \Xi_S; \Theta_L, \Xi_L; E_L; \lambda_L)) +$ -- therefor.

Line 19: delete " $F_H *(\Theta_S, \Xi_S; \Theta_L, \Xi_L E_L; \lambda_L) \rightarrow \min$ "

and substitute -- $F_H * H(\Theta_S, \Xi_S; \Theta_L, \Xi_L; E_L; \lambda_L) \Rightarrow \min$ -- therefor.

Line 22: delete " $(K_{max} - K(\Theta_S, \Xi_S; \Theta_L, \Xi_L E_L; \lambda_L))$ "

and substitute -- $(K_{max} - K(\Theta_S, \Xi_S; \Theta_L, \Xi_L; E_L; \lambda_L))$ -- therefor.

UNITED STATES PATENT AND TRADEMARK OFFICE
CERTIFICATE OF CORRECTION

PATENT NO. : 7,254,262 B2
APPLICATION NO. : 10/687914
DATED : August 7, 2007
INVENTOR(S) : Uwe Nehse, Gerhard Linss and Olaf Kuehn It is certified that error appears in the above-identified patent and that said Letters Patent is hereby corrected as shown below:

Line 24: delete " $((I_{max}/2) - \overline{I}(\Theta_S, \Xi_S; \Theta_L; E_L \lambda_L))$ "

and substitute -- $((I_{max}/2) - \overline{I}(\Theta_S, \Xi_S; \Theta_L, \Xi_L; E_L; \lambda_L))$ -- therefor.

Line 26: delete " $H(\Theta_S, \Xi_S; \Theta_L, E_L; \lambda_L)$ "

and substitute -- $H(\Theta_S, \Xi_S; \Theta_L, \Xi_L; E_L; \lambda_L)$ -- therefor.

Column 15:
Line 7: delete "$F_1*Focusvalue_1 + F_2*Focusvalue_2 + \ldots F_N*Focusvalue_N \rightarrow$ max" and substitute -- $F_1* Focusvalue_1 + F_2*Focusvalue_2 + \ldots F_N*Focusvalue_N \Rightarrow$ max -- therefor.

Column 16:
Line 53: delete "$F_1*Edgesitecriterion_1 + F_2*Edgesitecriterion_2 + \ldots F_N*Edgesitecriterion_N \rightarrow$ max" and substitute --$F_1*Edgesitecriterion_1 + F_2*Edgesitecriterion_2 + \ldots F_N*Edgesitecriterion_N \Rightarrow$ max -- therefor.

Signed and Sealed this

Fifteenth Day of April, 2008

JON W. DUDAS
*Director of the United States Patent and Trademark Office*